US010001242B2

(12) United States Patent
van Hooft et al.

(10) Patent No.: US 10,001,242 B2
(45) Date of Patent: Jun. 19, 2018

(54) STAND FOR A PORTABLE DEVICE WITH A GRAPHIC USER INTERFACE DISPLAY (71) Applicant: BakkerElkhuizen Innovations B.V., Vught (NL)

(72) Inventors: Jan Thomas Lambertus van Hooft, Vught (NL); Tristan Margareth Raphael Petronella Frencken, Vught (NL)

(73) Assignee: BakkerElkhuizen Innovations B.V., Vught (NL)

( * ) Notice: Subject to any disclaimer, the term of this patent is extended or adjusted under 35 U.S.C. 154(b) by 0 days. days.

(21) Appl. No.: 15/121,315

(22) PCT Filed: Feb. 28, 2014

(86) PCT No.: PCT/NL2014/050124
§ 371 (c)(1),
(2) Date: Aug. 24, 2016

(87) PCT Pub. No.: WO2015/130161
PCT Pub. Date: Sep. 3, 2015

(65) Prior Publication Data
US 2017/0009934 A1    Jan. 12, 2017

(51) Int. Cl.
F16M 13/00 (2006.01)
G06F 1/16 (2006.01)
(Continued)

(52) U.S. Cl.
CPC ............ F16M 13/00 (2013.01); A47B 23/04 (2013.01); F16M 11/041 (2013.01);
(Continued)

(58) Field of Classification Search
CPC ............ A47B 2023/047; A47B 23/042; A47B 23/043; A47B 23/06; A47B 19/08;
(Continued)

(56) References Cited

U.S. PATENT DOCUMENTS 2,611,572 A    9/1952    La Rocca
3,477,700 A    11/1969    Gallamos
(Continued)

FOREIGN PATENT DOCUMENTS

CN    202049413    11/2011
DE    20 2010 002781    8/2010
(Continued)

OTHER PUBLICATIONS

International Search Report from PCT/NL2013/050055 dated Jul. 31, 2013.
(Continued)

Primary Examiner — Stanton L Krycinski
Assistant Examiner — Taylor L Morris
(74) Attorney, Agent, or Firm — Swanson & Bratschun, L.L.C.

(57) ABSTRACT

A stand for supporting a portable display device with a graphic user interface display screen in a generally upright position leaning backward. The stand has a carrier panel and a support pivotable relative to the carrier panel about a pivot axis, between a transport position and a support position for supporting the carrier panel in an orientation projecting obliquely upward from the support surface. An angle setting member holds the carrier panel and the support at a set mutual angle when the support is in its support position. A device holder is attached or attachable to the device in a fixed position and adjustably connected to the carrier panel for guided movement in a direction perpendicular to the pivot axis and in rotational sense about an axis of rotation perpendicular to the carrier panel.

14 Claims, 6 Drawing Sheets (51) Int. Cl.
*A47B 23/04* (2006.01)
*F16M 11/04* (2006.01)
*F16M 11/38* (2006.01)
*F16M 11/10* (2006.01)

(52) U.S. Cl.
CPC ........... *F16M 11/046* (2013.01); *F16M 11/10* (2013.01); *F16M 11/105* (2013.01); *F16M 11/38* (2013.01); *G06F 1/162* (2013.01); *G06F 1/1616* (2013.01); *G06F 1/1633* (2013.01); *G06F 1/1637* (2013.01); *A47B 23/043* (2013.01); *G06F 1/1626* (2013.01); *G06F 1/1632* (2013.01); *G06F 1/1669* (2013.01); *G06F 2200/1614* (2013.01)

(58) Field of Classification Search
CPC ........ G06F 1/1662; G06F 1/16; G06F 1/1613; G06F 1/1616; G06F 1/1622; G06F 1/1628; G06F 1/1632; G06F 1/1633; G06F 1/1667; G06F 1/1675; G06F 1/1637; F16M 11/00; F16M 11/041; F16M 11/046; F16M 11/105; F16M 11/10; A45C 2011/003; A45C 11/00; A45C 2200/15; A45C 2011/002
USPC .................. 248/454, 455, 457, 460; 206/320
See application file for complete search history.

(56) References Cited

U.S. PATENT DOCUMENTS

| | | | |
|---|---|---|---|
| 4,197,618 A | 4/1980 | Bourguignon | |
| 4,622,767 A | 11/1986 | Sullivan | |
| 4,674,724 A | 6/1987 | Gaudet | |
| 5,083,663 A | 1/1992 | Conway | |
| 5,234,190 A | 8/1993 | Cross | |
| 5,253,840 A | 10/1993 | Sheremetta | |
| 5,413,305 A | 5/1995 | Leeb | |
| 5,451,025 A | 9/1995 | Hames | |
| 6,082,696 A | 7/2000 | Patterson | |
| 6,098,952 A | 8/2000 | Tonn | |
| 6,515,852 B2* | 2/2003 | Huang | G06F 1/1626 235/145 R |
| 6,538,642 B2* | 3/2003 | Tsai | G06F 1/1626 345/168 |
| 6,557,897 B1 | 5/2003 | Gaudet | |
| 6,585,217 B2* | 7/2003 | Huang | G06F 1/1632 248/455 |
| 6,672,549 B2 | 1/2004 | Kolb | |
| 6,898,075 B2* | 5/2005 | Li | G06F 1/1632 312/223.1 |
| 6,967,836 B2 | 11/2005 | Huang | |
| 7,248,904 B2* | 7/2007 | Gartrell | A45C 11/00 379/433.01 |
| 7,281,698 B2* | 10/2007 | Patterson, Jr. | A45C 11/00 206/756 |
| 7,694,920 B2 | 4/2010 | Lien | |
| 7,735,644 B2 | 6/2010 | Sirichai | |
| 7,758,009 B1* | 7/2010 | Chang | A47B 23/044 248/453 |
| 7,861,995 B2 | 1/2011 | Liou | |
| D651,213 S | 12/2011 | Magness | |
| 8,100,376 B2 | 1/2012 | Ye | |
| 8,230,992 B2* | 7/2012 | Law | G06F 1/1626 206/320 |
| 8,282,065 B1 | 10/2012 | Stone | |
| 8,382,059 B2 | 2/2013 | Le Gette | |
| 8,714,351 B2* | 5/2014 | Toulotte | A45C 11/00 206/320 |
| 8,749,960 B2* | 6/2014 | Mori | H05K 5/0086 248/346.03 |
| 8,797,132 B2 | 8/2014 | Childs | |
| 8,833,554 B2 | 9/2014 | Busri | |
| 8,910,915 B2 | 12/2014 | Wibby | |
| 8,925,722 B2* | 1/2015 | Poon | F16M 13/00 206/320 |
| 8,960,421 B1* | 2/2015 | Diebel | G06F 1/1679 206/320 |
| 9,013,863 B2* | 4/2015 | Hsu | H05K 7/1401 206/320 |
| D741,070 S | 10/2015 | Martin | |
| 9,203,945 B2* | 12/2015 | Chin | G06F 1/1628 |
| 9,267,638 B2 | 2/2016 | Le Gette | |
| 9,287,917 B1 | 3/2016 | Tages | |
| 9,307,656 B2 | 4/2016 | Murchison | |
| 9,308,767 B1 | 4/2016 | Waldron | |
| 9,377,810 B2 | 6/2016 | Hishinuma | |
| 9,382,033 B2 | 7/2016 | Poon | |
| 9,489,015 B2 | 11/2016 | Gioscia | |
| 9,762,713 B2 | 9/2017 | Lambert | |
| 9,800,283 B2* | 10/2017 | Schmidt | H04B 1/3877 |
| 2003/0089832 A1 | 5/2003 | Gold | |
| 2003/0213886 A1 | 11/2003 | Gilbert | |
| 2004/0001047 A1* | 1/2004 | Wang | G06F 1/1632 345/168 |
| 2006/0007645 A1 | 1/2006 | Chen | |
| 2007/0283855 A1* | 12/2007 | Pozzi | A47B 23/043 108/44 |
| 2008/0302687 A1 | 12/2008 | Sirichai | |
| 2010/0053876 A1* | 3/2010 | Widmer | G06F 1/1616 361/679.27 |
| 2010/0283269 A1 | 11/2010 | Fiedler | |
| 2011/0069446 A1 | 3/2011 | Trang | |
| 2011/0163211 A1 | 7/2011 | Cicco | |
| 2011/0192857 A1* | 8/2011 | Rothbaum | B25F 1/00 220/694 |
| 2011/0227463 A1 | 9/2011 | Hou | |
| 2012/0018324 A1* | 1/2012 | Hale | F16M 11/041 206/320 |
| 2012/0037047 A1* | 2/2012 | Moldovan | A47B 23/043 108/3 |
| 2012/0072167 A1 | 3/2012 | Cretella, Jr. | |
| 2012/0075789 A1 | 3/2012 | Decamp | |
| 2012/0103855 A1* | 5/2012 | Gaddis, II | G06F 1/1628 206/521 |
| 2012/0217174 A1 | 8/2012 | Ting | |
| 2012/0305739 A1* | 12/2012 | Huang | F16M 11/10 248/559 |
| 2012/0318950 A1 | 12/2012 | Wilber | |
| 2012/0325689 A1* | 12/2012 | Wibby | A47B 23/043 206/45.2 |
| 2013/0009878 A1* | 1/2013 | Wu | G06F 1/1632 345/169 |
| 2013/0015310 A1* | 1/2013 | Wu | F16M 11/10 248/346.06 |
| 2013/0016467 A1 | 1/2013 | Ku | |
| 2013/0114198 A1 | 5/2013 | Gengler | |
| 2013/0214661 A1 | 8/2013 | McBroom | |
| 2014/0183314 A1* | 7/2014 | Mulhern | F16M 13/022 248/288.11 |
| 2015/0173221 A1 | 6/2015 | Yoo | |
| 2015/0194998 A1* | 7/2015 | Fathollahi | H04B 1/3888 455/575.8 |
| 2015/0359328 A1 | 12/2015 | van Hooft | |
| 2015/0374118 A1 | 12/2015 | van Hooft | |

FOREIGN PATENT DOCUMENTS

| | | |
|---|---|---|
| DE | 20 2011 000630 | 10/2011 |
| DE | 20 2011 101534 | 11/2011 |
| EP | 1301847 | 3/2004 |
| EP | 1031847 | 6/2006 |
| EP | 1577737 | 12/2006 |
| EP | 2189873 | 5/2010 |
| EP | 1536717 | 8/2011 |
| EP | 1447024 | 12/2011 |
| EP | 2487877 | 8/2012 |
| GB | 2512839 | 10/2014 |
| NL | 1038362 | 11/2010 |
| WO | WO 2003/056956 | 7/2003 |

(56) References Cited

FOREIGN PATENT DOCUMENTS

| WO | WO 2004/034839 | 4/2004 | | |
|---|---|---|---|---|
| WO | WO 2009/131841 | 10/2009 | | |
| WO | WO 2010/036090 A3 | 4/2010 | | |
| WO | WO 2012016158 A2 * | 2/2012 | ........... | F16M 11/041 |
| WO | WO 2012/111994 | 8/2012 | | |
| WO | WO 2012/125912 | 9/2012 | | |
| WO | WO 2012/166820 | 12/2012 | | |
| WO | WO 2013/158057 | 10/2013 | | |
| WO | WO 2013/162963 | 10/2013 | | |

OTHER PUBLICATIONS

International Search Report from PCT/NL2013/050054 dated Nov. 5, 2013.
International Search Report from PCT/NL2014/050124 dated Nov. 7, 2014.
Examination Report from EP App No. 13 705 844.2 dated Jan. 23, 2017.
Office Action from U.S. Appl. No. 14/765,632 dated Feb. 9, 2017.
Office Action from U.S. Appl. No. 14/765,727 dated Feb. 10, 2017.
Notice of Allowance from U.S. Appl. No. 14/765,632 dated Nov. 16, 2017.
Office Action from U.S. Appl. No. 14/765,727 dated Oct. 31, 2017.

\* cited by examiner

STAND FOR A PORTABLE DEVICE WITH A GRAPHIC USER INTERFACE DISPLAY

RELATED APPLICATIONS

This application is a 35 U.S.C. § 371 national phase application of PCT/NL2014/050124 (WO 2015/130161), filed on Feb. 28, 2014, entitled "Stand for a Portable Device with a Graphic User Interface Display", which is incorporated herein by reference in its entirety.

FIELD AND BACKGROUND OF THE INVENTION

The present invention relates to a stand for a portable device with a graphic user interface, such as a display or a tablet computer.

Portable computers, usually denoted by the term "laptop computer", "laptop" or "notebook" are not only used during travel, but are also used frequently and for long periods as a desktop device, in particular by users who use the computer regularly in different offices and/or at home. Frequent and prolonged use also occurs in the use of tablet computers that can be operated by touching fields displayed on the display screen, in particular when such devices are (also) operated using a keyboard.

Frequent and prolonged use of such portable computers, of which the design is to a large extent adapted for compactness and portability, entails a number of ergonomic problems. Typically, the position of the display is not sufficiently high, which causes a great risk of neck complaints. For tablet computers an additional problem is supporting the device at a suitable angle so that the display faces in a direction matching the desired viewing angle.

For supporting the display of a laptop computer in an ergonomically better position, a wide variety of laptop supports are known. Examples of laptop supports are shown in applicant's European Patents 1 301 847, 1 447 024 and 1 577 737.

Most laptop supports are intended to be left at a workplace and to be used by user bringing the laptop computer to that workplace. Some laptop and tablet computer stands are foldable to a flat configuration so that also the laptop stand can easily be carried along with the laptop computer and the laptop, such laptop supports are disclosed in European Patents 1 301 847 and 1 447 024. European patent 1 536 717 and U.S. Pat. No. 6,098,952 disclose foldable laptop supports arranged to be attached to a bottom of a keyboard portion of a laptop computer. International patent application WO2010/036090 and U.S. patent application publ. nr. 2012/0072167 discloses supports attachable to a tablet computer.

SUMMARY OF THE INVENTION

It is an object of the present invention to provide a stand for a portable device with a graphic user interface display screen, such as a laptop computer or a display, which is particularly light and flat.

According to the invention, this object is achieved by providing a stand according to claim 1.

Because the support supports the carrier panel in an orientation projecting obliquely upward from its lower end at or near the support surface and a device holder is attached or attachable to the device in a fixed position and adjustably connected to the carrier panel for guided movement in a direction perpendicular to the pivot axis and in rotational sense about an axis of rotation perpendicular to the carrier panel, the level above the support surface at which the display screen is held can easily be adjusted and its orientation can easily be changed between landscape and portrait, without removing the device from the stand.

The invention can also be embodied in a case according to claim 18 and in a method according to claim 19.

Particular elaborations and embodiments of the invention are set forth in the dependent claims.

Further features, effects and details of the invention appear from the detailed description and the drawings.

DETAILED DESCRIPTION

The invention is first described with reference to a first example of a stand according to the invention as shown in FIGS. 1-8. The stand 1 is for supporting a portable display device 2, in the present example a tablet computer, on a horizontal flat support surface 3 (see FIG. 6). The table computer 2 has a graphic user interface display screen 4 and is supported in an orientation in which the screen 4 is in a generally upright position leaning backward.

Figure 1:
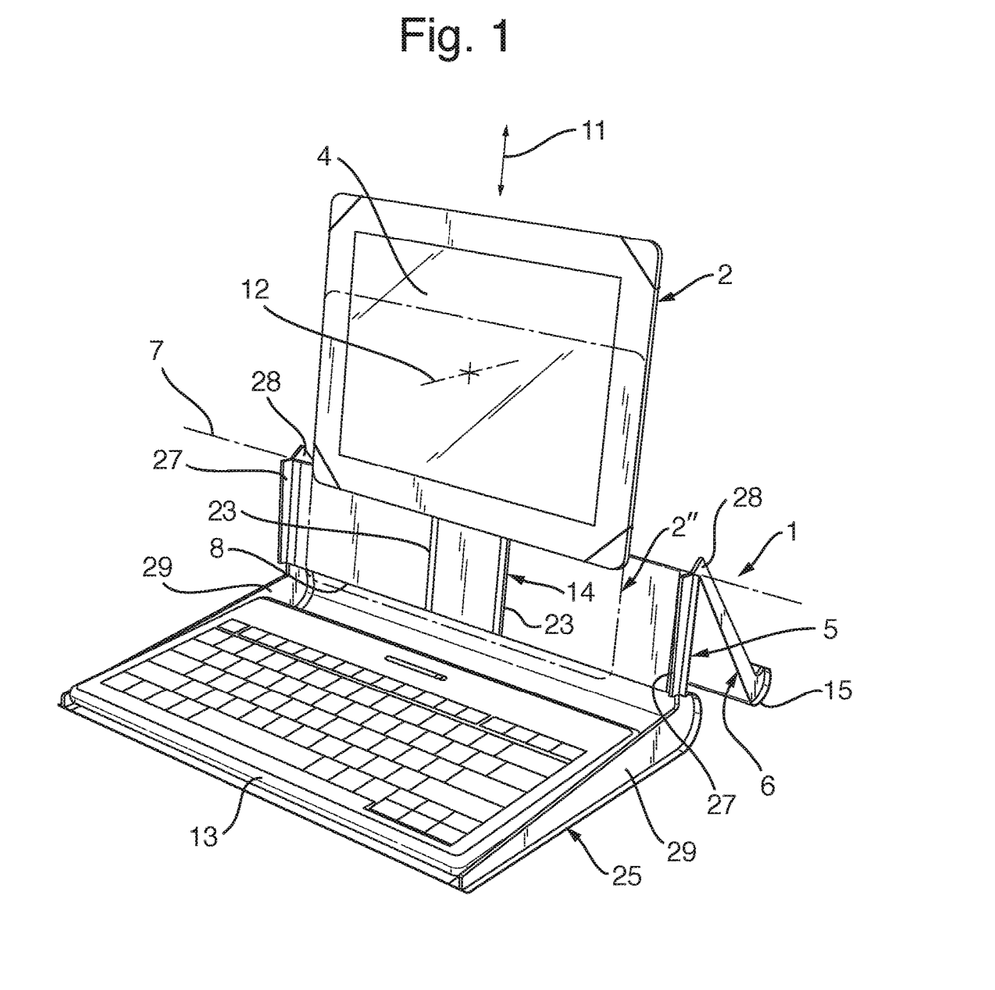
FIG. 1 is a perspective view of an example of a stand according to the invention supporting a tablet computer, a keyboard being positioned on a panel of the stand.
Figure 2:
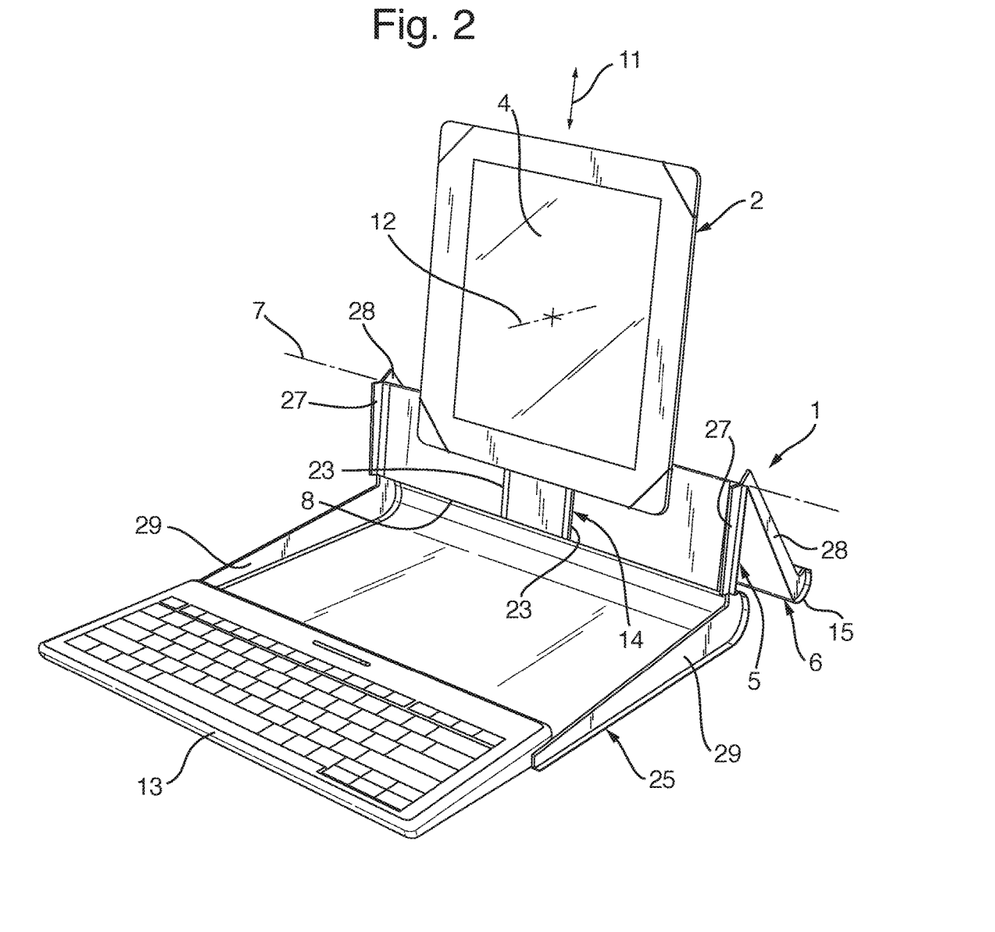
FIG. 2 is a perspective view of the stand, the tablet computer and the keyboard shown in FIG. 1, with the tablet computer and the keyboard in different positions.
Figure 3:
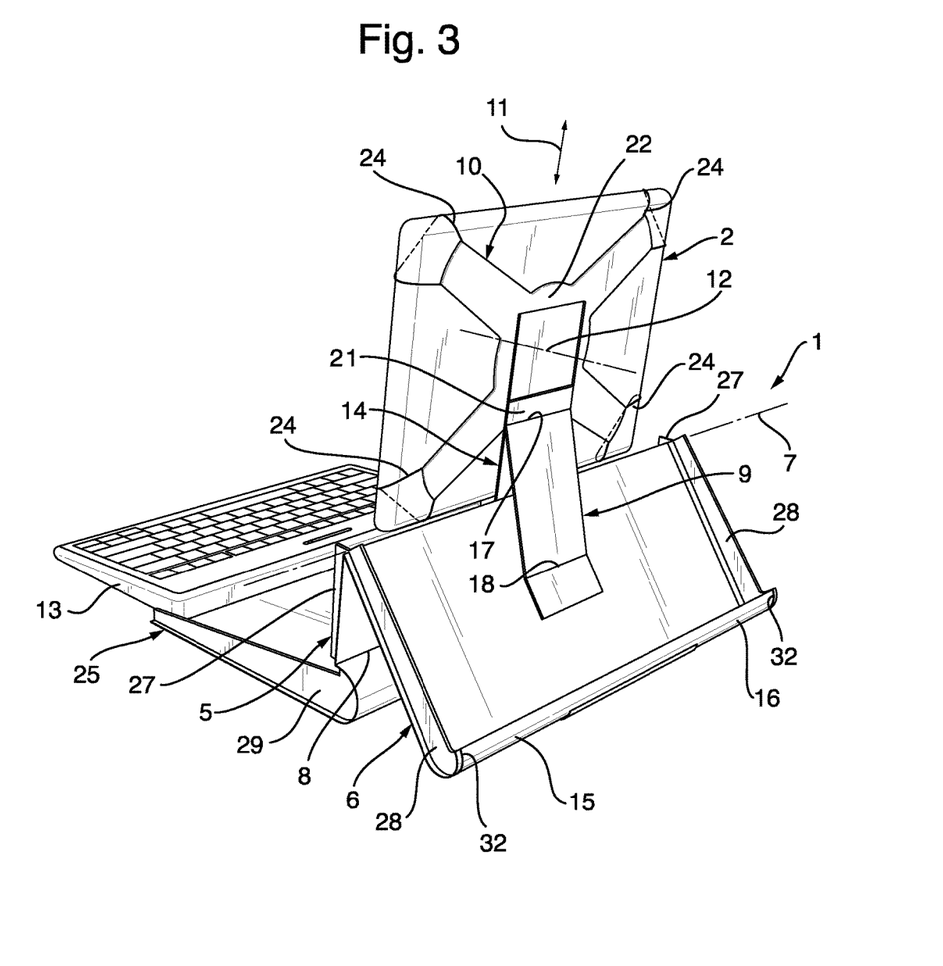
FIG. 3 is a perspective view of the arrangement shown in FIG. 2 from a different (rear) viewing angle.
Figure 4:
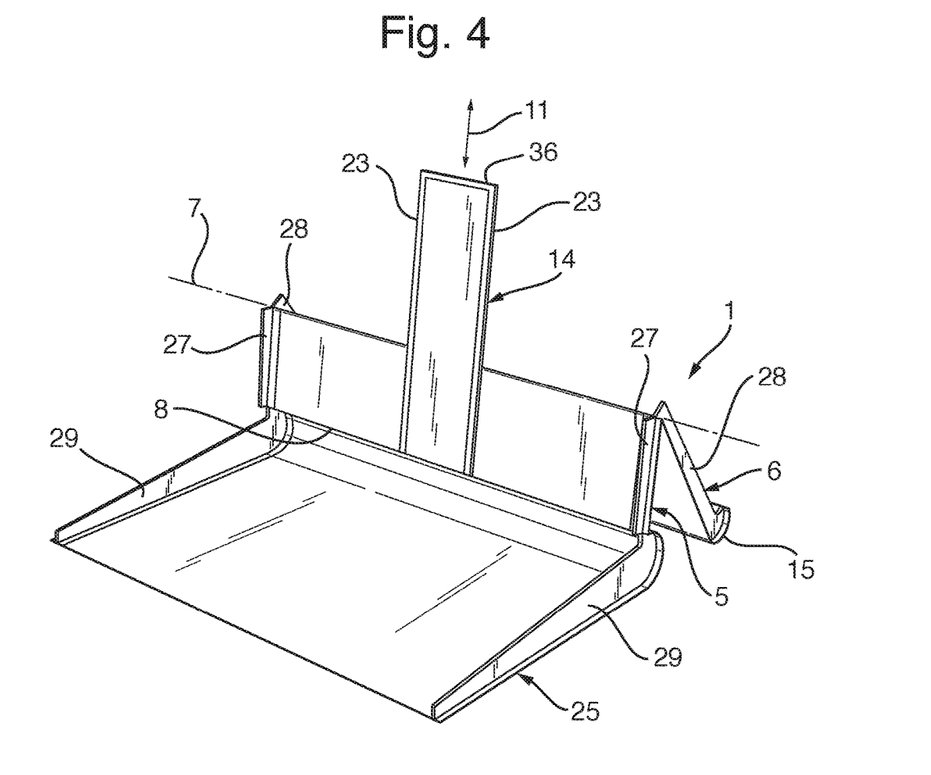
FIG. 4, is a perspective view as shown in FIG. 2, but without the tablet computer, the keyboard and a device holder attachable to the tablet computer
Figure 5:
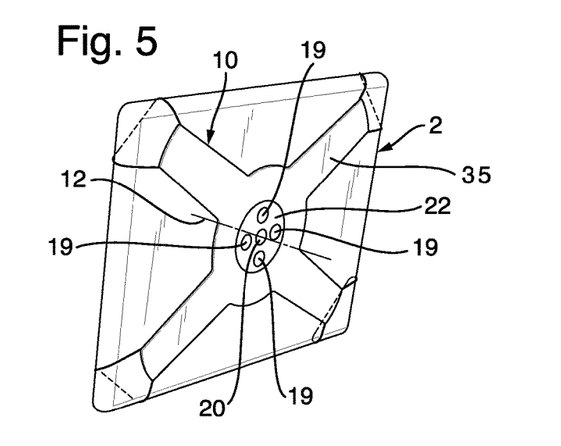
FIG. 5 is perspective rear view of the tablet computer shown in FIGS. 1-3 with a device holder of the stand shown in FIGS. 1-4 attached to a rear face of the tablet computer.

The stand has a carrier panel 5 and a support panel 6 hinged so as to be pivotable relative to the carrier panel about a pivot axis 7. The carrier panel 5 and the support panel 6 are pivotable about the axis 7 between a transport position (FIG. 7) in which the carrier panel 5 and the support panel 6 are co-planar and in-line with each other and a support position in which the support panel 6 projects transversely from the carrier panel 5 at an enclosed angle α (see FIG. 6) for supporting the carrier panel 5 in an orientation projecting obliquely upward from its lower end 8 at or near the support surface 3. The stand 1 further has an angle setting member 9 for holding the carrier panel 5 and the support panel 6 at a set mutual angle α when the support panel is in its support position. A device holder 10 is provided that is attached or attachable to the device 2 in a fixed position. The device holder 10 is adjustably connected to the carrier panel 5 for guided movement in a direction 11 perpendicular to the pivot axis 7 and in rotational sense about an axis of rotation 12 perpendicular to the carrier panel 5. Thus, the device holder 10 is guided in a manner allowing adjustment of the screen between a portrait and a landscape position, as is illustrated by FIGS. 1 and 2, and in generally up and down directions 11, as is illustrated by the positions 2 and 2", in FIG. 1, without removing the device 2 from the stand 1.

Upward adjustment of the position of the display screen 4 is of particular importance for allowing a user to operate the device using a keyboard 13 while seated in an ergonomically sound posture that reduces the risk of back and neck complaints. Easy adjustment between landscape and portrait positions of the display screen 4 is of particular advantage when the supported device 2 is a tablet computer, which is typically provided with automatic adjustment of the image between landscape and portrait to the orientation in which the device is held.

The device holder 10 is connected to the carrier panel 5 via a carrier tongue 14 projecting from the carrier panel 5 beyond an upper edge of the carrier panel 5 when the support panel 6 is in the support position. The carrier tongue 14 extends from the carrier panel 5 closely along and parallel to the support panel 6 when the support panel 6 is in the transport position. When the support panel 6 is in the transport position, the carrier panel 5, the support panel 6 and the carrier tongue 14 can extend closely along the device 2 to be supported, so that little volume is added and transport and storage together with the device 2 is facilitated. When the support panel 6 is in the support position it is folded back from the device 2 while the carrier tongue 14 projects upwardly from the carrier panel 5, so that it can carry the device holder 10 in a position above the top end of the carrier panel 5 where the support panel 6 has been folded back to form a support for the carrier panel 5, the lower end 15 of the support panel 6 resting on the support surface 3. Thus, the device 2 can be held in a position relatively high above the support surface 3, which is again favorable for allowing a user to operate the device using a keyboard 13 while seated in a good ergonomic posture, even though the carrier panel 5 and the support panel 6 are relatively compact and dimensioned to protrude only slightly beyond the device 2.

The support panel 6 has an end wall 16 closely adjacent to its distal, lower end 15 opposite of the pivot axis 7 and projecting transversely beyond the carrier tongue 14 (see position 16" in FIG. 6), when the support panel 6 is in the transport position, for enclosing the device 2 during transport. Thus, the support panel 6 shields the device 2 when in the transport position, yet does not obstruct upward positioning of the device 2 in use, when the support panel 6 is in the support position folded back from the carrier panel 5, the carrier tongue 14 and the device 2 carried thereby.

The angle setting member 9 is hingedly coupled to the support panel 6 and to the carrier tongue 14 in positions 17, 18 spaced from the pivoting axis 7, so that it forms a stable triangle with portions of the support panel 6 and the carrier tongue 14 extending from the pivoting axis 7 for maintaining the support panel 6 at a fixed angle relative to the carrier panel 5 and the carrier tongue 14. Moreover, the carrier tongue 14 is supported close to where the device 2 is carried, so that the carrier tongue 14 does not have to be stiff for providing sufficiently stable support of the device 2 and can be of a lightweight construction. The hinges at positions 17, 18 may for instance be formed by flexible sheet material, e.g. Polyethylene or Polypropylene, bridging a narrow gap between panels of a stiffer material, e.g. metal or fiber reinforced plastic, attached to the layer of flexible material.

This angle is adjustable in a simple manner, because the angle setting member 9 is hinged to the support panel 6 for hinging about an axis in a fixed position 18 relative to the support panel 6 and the angle setting member 9 is releasably attachable to a back side of the carrier tongue 14 in a plurality of positions. For transport, the angle setting member 9 can be folded flat against the support panel 6 about the axis in the position 18.

The device holder 10 has a plurality of connecting members 19, 20 (see FIG. 5) for connecting the device holder 10 to the carrier tongue 14. In the present example, the connecting members 19, 20 are of a permanently magnetic material, for example magnets made from an alloy of neodymium, iron and boron in the form of a $Nd_2Fe_{14}B$ tetragonal crystalline structure. The carrier tongue 14 is of a magnetically attractable material (such as steel). Preferably, the connecting members 19, 20 have surface covers of bearing material for facilitating sliding of the device holder 10 along the carrier tongue 14 and in rotational sense, without generating substantial wear. The bearing material preferably has a coefficient of friction relative to the carrier tongue surface of 0.15-0.35 and may for instance be constituted by Polyamide in film or textile form, which also has good wear resistance. Thus, a releasable and adjustable mounting of the device holder 10 to the carrier tongue 14 is achieved in a simple manner. The connection allows sliding of the connecting members 19, 20 along the surface of the connecting tongue for adjusting the height at which the device 2 is supported and for adjusting the position of the device 2 in rotational sense about rotation axis 12 between portrait and landscape positions, while maintaining the device holder 10 in tight contact with the carrier tongue 14.

It is noted that also both the connecting tongue and the connecting member or members can be of permanently magnetic material. Alternatively, only the connecting tongue can be of permanently magnetic material, the connecting member or members being of magnetically attractable material. If no connecting tongue is provided and the device holder is connected to the carrier panel directly, the carrier panel may be of permanently magnetic or magnetically attractable material.

Since a plurality of permanently magnetic connecting members 19, 20 has been provided, the connecting members 19, 20 are relatively invulnerable mechanically, yet provide a reliable, releasable adherence to the connecting tongue 14. Also, the distance between connecting members 19, 20 increase the leverage against rotation at a given normal force between the connecting members 19, 20 and the connecting tongue 14 as exerted by the magnets 19, 20.

A particularly efficient construction and convenient adjustability has been achieved, because the angle setting member 9 is magnetically attachable to a back side of the carrier tongue 14. To this end, an end portion 21 of the angle setting member 9 hinged along line 17 includes a permanently magnetic material as well. The polarity of this magnetic material is oriented such that it also attracts the connecting members 19, 20 when placed opposite these members, so that adherence of the connecting members 19, 20 and of the end portion 21 of the angle setting member 9 to the carrier tongue 14 is further increased. At its side facing the carrier tongue 14 when in support position, the magnetic material of end portion 21 is also covered with bearing material identical or similar to the bearing material covering magnets 19, 20 at the side facing the carrier tongue 14. Thus, smooth sliding during adjustment of the angle is achieved while scraping and wear of the magnetic and metal material are counteracted. Furthermore a plate of magnetically attractable material covers the side of the magnetic material of end portion 21 facing away from the carrier tongue 14, so that the magnetic field the magnetic material of end portion 21 is concentrated towards the carrier tongue 14.

Figure 6:
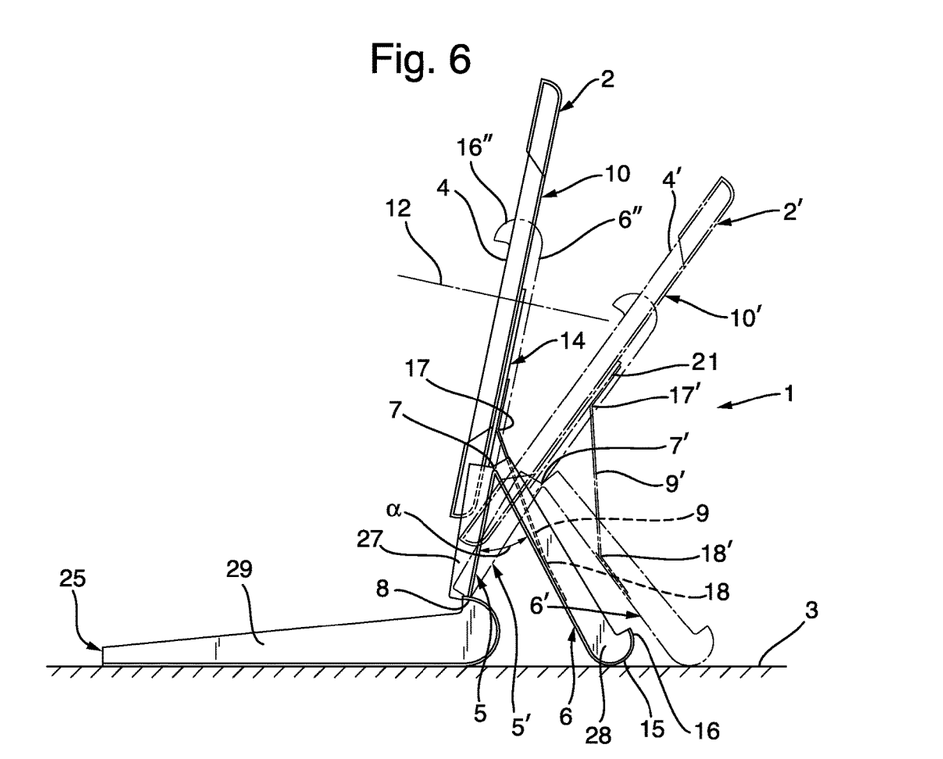
FIG. 6 is a side view of the stand and the tablet computer shown in FIGS. 1-5 with the tablet computer supported in two mutually different positions.

In FIG. 6, it is illustrated how the angle at which a device 2 is supported relative to the support surface 3 is adjustable to, for example, a more inclined position 2'. By sliding the end of the angle setting member 9 from a position 17 to a position 17' the angle setting member 9' is brought in an orientation holding the support panel 6' in a less acute angle α relative to the carrier panel 5' and the carrier tongue 10'. Thus, the carrier panel 5' and the carrier tongue 10' carrying the device 2' lean more backward when the support panel 6' rests on the support surface 3 and the display screen 4' is held in a position leaning more backward.

Furthermore, in FIG. 6, reference numerals 6" and 16" designate the transport position of the support panel and its end wall shielding a device 2" (see FIG. 1) when lowered to its lowest position.

The device holder 10 has a shield 22 in the form of a plate of magnetically attractable material. The connecting members 19, 20 of permanently magnetic material are positioned on a side of the shield 22 facing the carrier tongue 14. Thus, the magnetic fields of the connecting members 19, 20 are oriented towards the connecting tongue, providing additional adherence, while the device 2 is shielded to a substantial extent from the magnetic fields of the connecting members 19, 20, so that the risk of the magnetic fields interfering with operation of the device 2 is limited.

When adjusting the position of the device holder 10 along the connecting tongue 14 in upward or downward direction 11 or in rotational sense about the axis 12, it is advantageous if the device holder 10 is prevented from slipping laterally off the tongue 14. To this end guides 23 are provided for guiding the device holder 10 in a longitudinal direction 11 perpendicular to the pivot axis 7 and the device holder 10 has guide members 19 guided by the guides 23. The guides 23 are in the form of strips or ridges between which a trough is left within which the guide members 19 are guided in longitudinal direction 11 and allowed to rotate about the rotation axis 12 (the latter moving with the device holder 10 when its position is adjusted up or down in directions 11). Thus, a guided adjustability and adjustability in rotational sense are combined in a single guide structure requiring no separate bearing for the rotational adjustability. Adjacent to a distal end of the carrier tongue 14, an abutment strip 36 is provided for preventing the device holder 10 from sliding off the carrier tongue 14 in longitudinal direction of the carrier tongue 14.

It is noted that, while according to the present example, two guides 2 are provided between which the guide members 19 are guided, it is also possible to provide a single guide member, for instance in the form of a slot, in which at least one guide member is guided. A single guide member can also be provided when guiding between guides on opposite sides bounding a track, as in the present example.

The construction according to the present example is moreover particularly efficient, because the guide members are formed by the connecting members 19, 20 that already project to the connecting tongue 14 for providing the desired adherence to the connecting tongue 14.

For attaching the device holder 10 to a device 2, the device holder has hooks formed by elastic loops 24 for engaging mutually opposite edge portions of a device 2 to be supported. The loops 24 are attached to legs of a spider shaped member 35 to which the shield 22 is adhesively attached. The spider has four legs, each oriented towards another edge portion of the device 2 engaged by the hooks 24. Thus, the device holder 10 can be attached to and removed from the device 2 in a simple manner. It is however also possible to attach the device holder to the device using an adhesive and/or fasteners. Furthermore, the device holder may constitute an integral, non-removable portion of the device.

Instead of elastic hooks, also inelastic hooks may be provided attached to elastic legs of the spider for tensioning the device holder between the mutually opposite edge portions. Also, only two legs coupled to diagonally opposite edge portions of the device to be supported can be sufficient for keeping the connecting members in position or the legs can be flexible in a plane parallel to the display screen as well. In both these alternative embodiments, the device holder can be attached to devices with different height/width ratios.

The device holder 10 is arranged for mounting the connecting members 19, 20 generally centrally to a back surface of the device 2 opposite of the display screen 4. This is advantageous for rotational adjustment between landscape and portrait positions of the device, because all edges of the device project over essentially the same distance from the axis of rotation, so relatively little space is needed for allowing the rotation, and the device is in principle balanced about the axis of rotation in both its landscape and portrait positions.

For more completely enveloping the device 2 during transport, the stand 1 has a shielding panel 25 hinged to an end of the carrier panel 5 opposite of the pivot axis 7, for folding between a transport position extending along the carrier panel 5 and the support panel 6, leaving a space 26 (see FIG. 8) between the shielding panel 25 and the carrier panel 5 and the support panel 6, for accommodating at least the device 2 to be supported by the stand 1. The shielding panel 25 has a flat distal end, so that the keyboard 13 can stand partially on the shielding panel 25 and partially on the support surface 3 without causing the keyboard 13 to tilt substantially. Because the end wall 16 of the support panel 6 extends towards the shielding panel 25 when in transport position, the absence of a projection at the free end of the shielding panel 25, which allows a keyboard to be positioned partially on and partially not on the shielding panel, yet does not entail that the stand is open between the distal ends of the support panel 6 and the shielding panel 25.

The carrier panel 5, the support panel 6 and the shielding panel 25 are provided with side closure walls 27, 28, 29, closing off sides of the support 1 between the shielding panel 25 and the carrier panel 5 and the support panel 6 when the support panel 6 and the shielding panel 25 are in the transport positions. Thus, the device 2 is not only completely covered on opposite sides, but also laterally, when the support panel 6 and the shielding panel 25 are in the transport positions.

Figure 8:
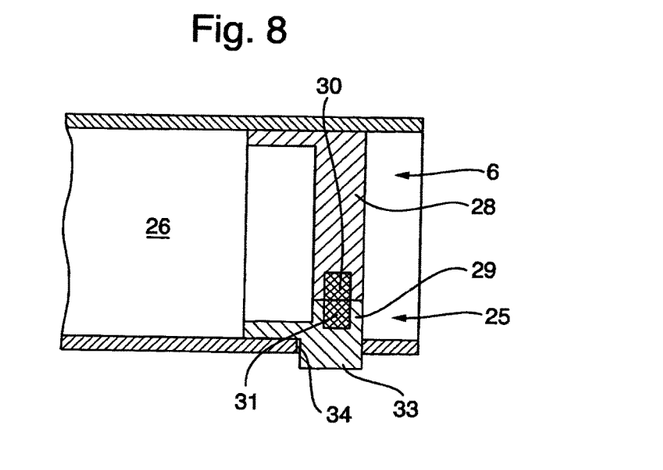
FIG. 8 is a cross-sectional view of a side portion of the stand shown in FIGS. 1-7.

As is shown in FIG. 8, the side closure walls 27, 28, 29 are equipped with magnets 30, 31 for releasably holding the stand 1 in closed transport position with side walls 27, 28, 29 firmly held against each other.

The closure walls 28, 29 of the support panel 6 and the shielding panel 25 have outer portions 32, 33 extending through openings 34 in the support panel 6 and the shielding panel 25 and projecting from the outer surfaces of the support panel 6 and the shielding panel 25 in a direction transverse to the outer surface for forming support feet and protecting members. Thus, the outer portions of the side closure walls 28, 29 also form support feet or, respectively, protection (rubbing) strips protecting surfaces of the support panel 6 and the shielding panel 25 from scratching and counteracting slipping of the stand 1 when the support panel 6 rests on a support surface 3 for supporting a device 2. Additionally or alternatively, the carrier panel may be provided with closure walls having outer portions projecting through openings and forming protection strips.

Figure 7:
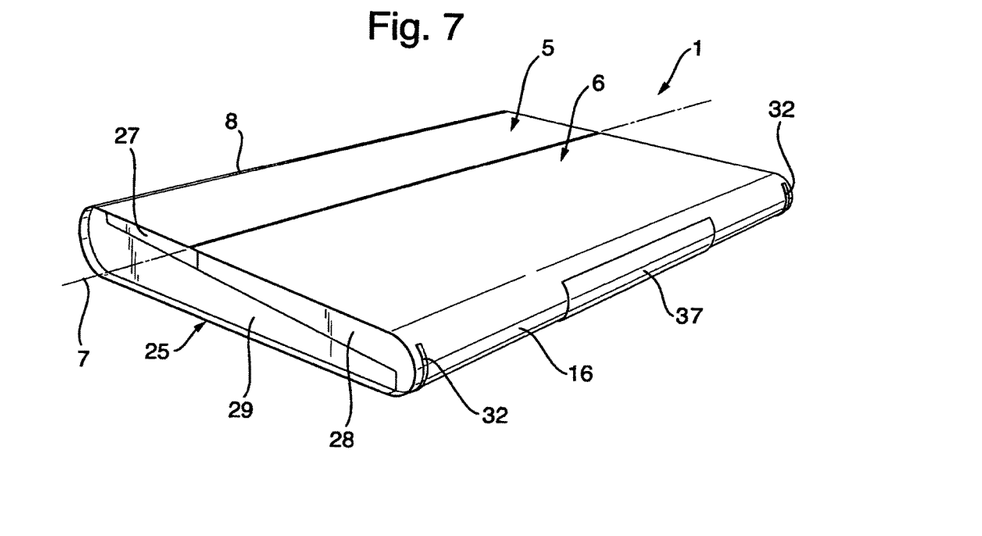
FIG. 7 is a perspective view of the stand shown in FIGS. 1-6 in transport configuration.

With the support panel 6 and the shielding panel 25 in the transport position, the stand forms a case enveloping the device 2 and the keyboard 13. As is best seen in FIG. 7, the case 1 may for instance have a handgrip 37 so that it can be carried easily. In the present example, the handgrip 37 is elastically retractable to a position in which it extends closely along the outer surface of the support panel 6, so that the handgrip 36 projects very little when it is not used.

Within the framework of the invention as set forth in the claims, many other examples than the example shown in the drawings and the variants discussed above are conceivable. For instance, instead of in the form of a support panel, the support may also be provided in the form of or include a foot member that may for instance be releasably coupled to the first panel. The foot member may for instance constitute a keyboard.

Furthermore, the position of the coupling of the angle setting member to the carrier tongue does not have to be adjustable in a continuous manner, but may also be arranged for mechanical attachment to the carrier tongue in a limited number of discrete positions. Also, the connection between the connecting members and the carrier tongue or the carrier panel does not have to be magnetic, but may for instance also be in the form of a mechanical connection holding a connecting member in the form of a guide stub in a position projecting into a guide slot, within which the guide stub is rotatable about its axis. Instead of mainly of metal plate material bent about a single axis of curvature and having sides closed off by walls of plastic material, the panels may also be of plate material pressed into three dimensionally curved shapes, of molded material or formed by plates attached to or enveloped in flexible upholstery material such as plastic film or leather also forming hinges between the panels. According to yet another variant, the shielding panel is coupled to an end of the support panel opposite the carrier panel, so that it is located on a side of the device distally of the user when the stand is in use.

The invention can also be embodied in a case composed of an outer wall of plate material, of which ends in axial direction of a pivot axis between hinged parts of the case are closed off by end walls and of which the end walls are of a polymeric and/or elastomeric material and project through openings in the plate material. Thus a case with rubbing strips can be manufactured in a particularly efficient manner.

Several features have been described as part of the same embodiment. However, it will be appreciated that the scope of the invention also includes embodiments having combinations of all or some of these features other than the specific combinations of features embodied in the examples.

The invention claimed is:

1. A stand for supporting a portable display device, such as a tablet computer or a display, on a horizontal flat support surface, with a graphic user interface display screen of the device in a generally upright position leaning backward:
   the stand comprising:
   a carrier panel;
   a support panel hinged so as to be pivotable relative to the carrier panel about a pivot axis, between a transport position co-planar or parallel to the carrier panel and a support position projecting transversely from the carrier panel at an angle for supporting the carrier panel in an orientation projecting obliquely upward from a lower end of the carrier panel at or near the support surface;
   an angle setting member for holding the carrier panel and the support panel at a set mutual angle when the support panel is in the support position; and
   a device holder attached or attachable to the device in a fixed position, the device holder being adjustably connected to the carrier panel via a carrier tongue projecting from the carrier panel beyond an upper edge of the carrier panel, at least when the support panel is in the support position, for guided movement along the carrier tongue in a direction perpendicular to the pivot axis and in rotational sense about an axis of rotation perpendicular to the carrier panel, wherein the carrier tongue extends from the carrier panel closely along and parallel to the support panel when the support panel is in the transport position, and wherein the support panel has an end wall closely adjacent to a distal end of the support panel and projecting transversely to the support panel beyond the carrier tongue, when the support panel is in the transport position, for enclosing the device during transport.

2. The stand according to claim 1, wherein the angle setting member is coupled to the support panel and to the carrier tongue in positions spaced from the pivot axis.

3. The stand according to claim 1, having at least one guide for guiding in a longitudinal direction perpendicular to the pivot axis and wherein the device holder has at least one guide member guided by the at least one guide.

4. The stand according to claim 3, wherein the device holder comprises at least one connecting member and wherein the at least one guide member is formed by the at least one connecting member.

5. The stand according to claim 1, wherein the device holder comprises hooks for engaging mutually opposite edge portions of a device to be supported for elastically tensioning the device holder between the mutually opposite edge portions.

6. The stand according to claim 1, wherein the device holder comprises at least one connecting member and wherein the device holder is arranged for mounting the at least one connecting member generally centrally to a back surface of the device opposite of the display screen.

7. The stand according to claim 1, further comprising a shielding panel hinged to an end of the carrier panel opposite of the pivot axis, for folding between a transport position extending along the carrier panel and the support panel, leaving a space between the shielding panel and the carrier panel and the support panel for accommodating at least the device to be supported by the stand.

8. The stand according to claim 7, wherein at least one of the carrier panel, the support panel and the shielding panel is provided with side closure walls, closing off sides of the stand between the shielding panel and the carrier panel and the support panel when the support panel and shielding panel are in the transport positions.

9. A stand for supporting a portable display device, such as a tablet computer or a display, on a horizontal flat support surface, with a graphic user interface display screen of the device in a generally upright position leaning backward,
   the stand comprising:
   a carrier panel,
   a support hinged so as to be pivotable relative to the carrier panel about a pivot axis, between a transport position and a support position for supporting the carrier panel in an orientation projecting obliquely upward from a lower end of the carrier panel at or near the support surface, an angle setting member for holding the carrier panel and the support at a set mutual angle when the support is in the support position, and a device holder attached or attachable to the device in a fixed position and adjustably connected to the carrier panel for guided movement in a direction perpendicular to the pivot axis and in rotational sense about an axis of rotation perpendicular to the carrier panel, wherein the device holder is connected to the carrier panel via a carrier tongue projecting from the carrier panel beyond an upper edge of the carrier panel, at least when the support is in the support position, wherein the angle setting member is coupled to the support and to the carrier tongue in positions spaced from the pivot axis; and wherein the angle setting member is hinged to the support for hinging about an axis in a fixed position relative to the support and wherein the angle setting member is releasably attachable to a back side of the carrier tongue in a plurality of positions.

10. A stand for supporting a portable display device, such as a tablet computer or a display, on a horizontal flat support surface, with a graphic user interface display screen of the device in a generally upright position leaning backward, the stand comprising:

a carrier panel, a support hinged so as to be pivotable relative to the carrier panel about a pivot axis, between a transport position and a support position for supporting the carrier panel in an orientation projecting obliquely upward from a lower end of the carrier panel at or near the support surface, an angle setting member for holding the carrier panel and the support at a set mutual angle when the support is in the support position, and a device holder attached or attachable to the device in a fixed position and adjustably connected to the carrier panel via a carrier tongue projecting from the carrier panel beyond an upper edge of the carrier panel, at least when the support is in the support position, for guided movement along the carrier tongue, wherein the device holder comprises at least one connecting member and wherein at least the at least one connecting member, the carrier panel or the carrier tongue is of a permanently magnetic material and wherein at least the other one of the at least one connecting member, the carrier panel or the carrier tongue is of a magnetic or magnetically attractable material, and wherein the connecting tongue further has at least one guide for guiding in a longitudinal direction perpendicular to the pivot axis, the device holder has at least one guide member guided by the at least one guide, said at least one guide and guide member allowing sliding of the device holder along the connecting tongue for adjusting the height at which the device is supported and for adjusting the position of the device in rotational sense about a rotation axis between portrait and landscape positions.

11. A stand for supporting a portable display device, such as a tablet computer or a display, on a horizontal flat support surface, with a graphic user interface display screen of the device in a generally upright position leaning backward, the stand comprising:

a carrier panel, a support hinged so as to be pivotable relative to the carrier panel about a pivot axis, between a transport position and a support position for supporting the carrier panel in an orientation projecting obliquely upward from a lower end of the carrier panel at or near the support surface, an angle setting member for holding the carrier panel and the support at a set mutual angle when the support is in the support position, and a device holder attached or attachable to the device in a fixed position and adjustably connected to the carrier panel for guided movement in a direction perpendicular to the pivot axis and in rotational sense about an axis of rotation perpendicular to the carrier panel, wherein the device holder is connected to the carrier panel via a carrier tongue projecting from the carrier panel beyond an upper edge of the carrier panel, at least when the support is in the support position, wherein the angle setting member is coupled to the support and to the carrier tongue in positions spaced from the pivot axis, wherein the device holder comprises at least one connecting member and wherein at least the at least one connecting member, the carrier panel or the carrier tongue is of a permanently magnetic material and wherein at least the other one of the at least one connecting member, the carrier panel or the carrier tongue is of a magnetic or magnetically attractable material, and wherein the angle setting member is magnetically attachable to a back side of the carrier tongue.

12. The stand according to claim 10, wherein the device holder comprises a shield of magnetically attractable material, wherein the at least one connecting member is of a permanently magnetic material and positioned on a side of the shield facing the carrier tongue.

13. A stand for supporting a portable display device, such as a tablet computer or a display, on a horizontal flat support surface, with a graphic user interface display screen of the device in a generally upright position leaning backward, the stand comprising:

a carrier panel, a support panel hinged so as to be pivotable relative to the carrier panel about a pivot axis, between a transport position co-planar or parallel to the carrier panel and a support position projecting transversely from the carrier panel at an angle, for supporting the carrier panel in an orientation projecting obliquely upward from a lower end of the carrier panel at or near the support surface, an angle setting member for holding the carrier panel and the support panel at a set mutual angle when the support panel is in the support position, a device holder attached or attachable to the device in a fixed position and adjustably connected to the carrier panel for guided movement in a direction perpendicular to the pivot axis and in rotational sense about an axis of rotation perpendicular to the carrier panel, and a shielding panel hinged to an end of the carrier panel opposite of the pivot axis, for folding between a transport position extending along the carrier panel and the support panel, leaving a space between the shielding panel and the carrier panel and the support panel for accommodating at least the device to be supported by the stand, wherein at least one of the carrier panel, the support panel and the shielding panel is provided with side closure walls, closing off sides of the stand between the shielding panel and the carrier panel and the support panel when the support panel and shielding panel are in the transport positions, and wherein the closure walls have outer portions extending through openings in said at least one of the carrier panel, the support panel and the shielding panel and projecting from an outer surface of said at least one of the carrier panel, the support panel and the shielding panel in a direction transverse to said outer surface for forming support feel and/or protecting members.

14. A method of supporting a portable device, such as a tablet computer or a display, by a stand on a horizontal flat support surface, with a graphic user interface display screen of the device in a generally upright position leaning backward, the method comprising:

providing a carrier panel;

providing a support panel hinged so as to be pivotable relative to the carrier panel about a pivot axis, between a transport position co-planar or parallel to the carrier panel and a support position projecting transversely from the carrier panel at an angle for supporting the carrier panel in an orientation projecting obliquely upward from a lower end of the carrier panel at or near the support surface;

providing an angle setting member holding the carrier panel and the support panel at a set mutual angle when the support panel is in the support position;

providing a carrier tongue projecting from the carrier panel beyond an upper edge of the carrier panel, at least when the support panel is in the support position, wherein the carrier tongue extends from the carrier panel closely along and parallel to the support panel when the support panel is in the transport position and wherein the support panel has an end wall closely adjacent to a distal end of the support panel and projecting transversely to the support panel beyond the carrier tongue, when the support panel is in the transport position, for enclosing the device during transport;

providing a device holder guided for movement along the carrier tongue in a direction perpendicular to the pivot axis and for movement in rotational sense about an axis of rotation perpendicular to the carrier panel; and attaching a device to the device holder in a fixed position.

* * * * *

UNITED STATES PATENT AND TRADEMARK OFFICE
CERTIFICATE OF CORRECTION

| | | |
|---|---|---|
| PATENT NO. | : 10,001,242 B2 | Page 1 of 2 |
| APPLICATION NO. | : 15/121315 | |
| DATED | : June 19, 2018 | |
| INVENTOR(S) | : Jan Thomas Lambertus van Hooft and Tristan Margareth Raphael Petronella Frencken | |

It is certified that error appears in the above-identified patent and that said Letters Patent is hereby corrected as shown below:

In the Claims

Claim 13 should read:
13. A stand for supporting a portable display device, such as a tablet computer or a display, on a horizontal flat support surface, with a graphic user interface display screen of the device in a generally upright position leaning backward,
    the stand comprising:
    - a carrier panel,
    - a support panel hinged so as to be pivotable relative to the carrier panel about a pivot axis, between a transport position co-planar or parallel to the carrier panel and a support position projecting transversely from the carrier panel at an angle, for supporting the carrier panel in an orientation projecting obliquely upward from a lower end of the carrier panel at or near the support surface,
    - an angle setting member for holding the carrier panel and the support panel at a set mutual angle when the support panel is in the support position,
    - a device holder attached or attachable to the device in a fixed position and adjustably connected to the carrier panel for guided movement in a direction perpendicular to the pivot axis and in rotational sense about an axis of rotation perpendicular to the carrier panel, and
    - a shielding panel hinged to an end of the carrier panel opposite of the pivot axis, for folding between a transport position extending along the carrier panel and the support panel, leaving a space between the shielding panel and the carrier panel and the support panel for accommodating at least the device to be supported by the stand,
    wherein at least one of the carrier panel, the support panel and the shielding panel is provided with side closure walls, closing off sides of the stand between the shielding panel and the carrier panel and the support panel when the support panel and shielding panel are in the transport positions, and
    wherein the closure walls have outer portions extending through openings in said at least one of the carrier panel, the support panel and the shielding panel and projecting from Signed and Sealed this
Sixth Day of November, 2018

Andrei Iancu
*Director of the United States Patent and Trademark Office* an outer surface of said at least one of the carrier panel, the support panel and the shielding panel in a direction transverse to said outer surface for forming support feet and/or protecting members.